US012139122B2

(12) United States Patent
Matsuzaki et al.

(10) Patent No.: US 12,139,122 B2
(45) Date of Patent: Nov. 12, 2024

(54) VEHICLE BRAKE SYSTEM

(71) Applicant: HONDA MOTOR CO., LTD., Tokyo (JP)

(72) Inventors: Katsuya Matsuzaki, Tokyo (JP); Eisuke Horii, Tokyo (JP); Katsuhito Kanbe, Tokyo (JP); Kei Yamano, Tokyo (JP); Soichiro Ueura, Wako (JP); Tomohiro Watanabe, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 470 days.

(21) Appl. No.: 17/539,585

(22) Filed: Dec. 1, 2021

(65) Prior Publication Data
US 2022/0176924 A1 Jun. 9, 2022

(30) Foreign Application Priority Data
Dec. 3, 2020 (JP) .................................. 2020-201249

(51) Int. Cl.
*B60T 8/172* (2006.01)
(52) U.S. Cl.
CPC ........... *B60T 8/172* (2013.01); *B60T 2220/04* (2013.01); *B60T 2250/00* (2013.01); *B60T 2260/04* (2013.01)
(58) Field of Classification Search
CPC .. B60T 8/172; B60T 2220/04; B60T 2250/00; B60T 2260/04
See application file for complete search history.

(56) References Cited

U.S. PATENT DOCUMENTS 11,136,021 B1 * 10/2021 Funke ................... B62D 7/159
2013/0304335 A1 * 11/2013 Suzuki ............ B60W 30/18136
701/70

(Continued)

FOREIGN PATENT DOCUMENTS

CN 103201145 A 7/2013
CN 110520338 A 11/2019
(Continued)

OTHER PUBLICATIONS

Office Action received in corresponding CN application No. 202111413993.1 dated Jul. 29, 2023; partial English translation included; 8 pages.

*Primary Examiner* — Peter D Nolan
*Assistant Examiner* — Wae L Louie
(74) *Attorney, Agent, or Firm* — Rankin, Hill & Clark LLP (57) ABSTRACT

A vehicle brake system including: a pressurizing motor that is connected to a brake pedal and configured to increase a braking force that is generated; and a processor. The processor is configured with a program to perform operations including: operation as an information acquisition part to obtain information on whether a shift position of an automatic transmission is in a non-driving mode and information on operation on the brake pedal; and operation as a braking force controller to perform, when a predetermined retention condition is met, control of braking force so that a stationary state of a host vehicle is maintained. When the predetermined retention condition is met and the shift position is in the non-driving mode, the braking force controller is configured to perform control to increase the braking force that is generated using the pressurizing motor once the brake pedal is in a non-operated state.

8 Claims, 4 Drawing Sheets

(56) References Cited

U.S. PATENT DOCUMENTS

| | | | |
|---|---|---|---|
| 2014/0350816 A1 | 11/2014 | Tahara et al. | |
| 2015/0057859 A1 | 2/2015 | Yamamoto et al. | |
| 2015/0123456 A1* | 5/2015 | Sato | B60L 50/51 |
| | | | 303/3 |
| 2015/0217644 A1 | 8/2015 | Okano et al. | |
| 2018/0015929 A1* | 1/2018 | Miyaishi | B60W 20/40 |
| 2018/0354478 A1* | 12/2018 | Eckert | B60T 8/1708 |
| 2020/0017082 A1 | 1/2020 | Takahashi et al. | |
| 2020/0047729 A1* | 2/2020 | Ueura | B60T 13/662 |
| 2020/0095968 A1 | 3/2020 | Kanbe et al. | |
| 2020/0247385 A1* | 8/2020 | Nonami | B60W 10/11 |
| 2021/0139006 A1* | 5/2021 | Hiromura | B60T 13/166 |
| 2021/0188252 A1* | 6/2021 | Lu | B60W 40/12 |
| 2021/0276518 A1* | 9/2021 | Eisele | B60T 8/172 |
| 2022/0001845 A1* | 1/2022 | Itakura | F16D 66/00 |
| 2022/0176924 A1* | 6/2022 | Matsuzaki | B60T 8/172 |
| 2023/0211764 A1* | 7/2023 | Toelge | B60T 8/172 |
| | | | 303/6.01 |
| 2023/0391299 A1* | 12/2023 | Komatsu | B60T 8/172 |
| 2023/0398967 A1* | 12/2023 | Shibata | B60T 8/17 |
| 2024/0075915 A1* | 3/2024 | Horii | B60T 8/4081 |

FOREIGN PATENT DOCUMENTS

| | | |
|---|---|---|
| JP | 2004-058937 A | 2/2004 |
| JP | 2010-100134 A | 5/2010 |
| JP | 2014-227041 A | 12/2014 |
| JP | 2016-032997 A | 3/2016 |
| JP | 2017-035966 A | 2/2017 |
| JP | 2018-096332 A | 6/2018 |
| WO | 2014/034678 A1 | 3/2014 |

\* cited by examiner

VEHICLE BRAKE SYSTEM

CROSS-REFERENCE STATEMENT

The present application is based on, and claims priority from, Japanese Patent Application Number 2020-201249, filed Dec. 3, 2020, the disclosure of which is hereby incorporated by reference herein in its entirety.

BACKGROUND

Technical Field

The disclosure relates to a vehicle brake system used when braking a vehicle.

Related Art

In Patent Literature 1 (Japanese Unexamined Patent Application Publication No. 2014-227041), the Applicant discloses a vehicle brake system that includes a braking force retaining function that is configured so that, when a foot is removed from a brake pedal during a temporary stop of a vehicle, a braking force immediately before the removal is retained.

In the vehicle brake system of Patent Literature 1, when the braking force retaining function is in operation and the shift position of an automatic transmission of the vehicle is in a non-driving mode (a neutral position) in which power from the driving source is not transmitted to a drive wheel, a pressure intensifier (a pump) of a Vehicle Stability Assist (VSA) system ("VSA" is a registered trademark) is used to increase fluid pressure of braking fluid. (Hereinafter, the braking force retaining function may at times be referred to as a "brake hold (BH) function".) In this way, braking force related to the BH function is increased.

With the vehicle brake system of Patent Literature 1, a situation can be avoided in which a sudden movement of the vehicle occurs, which can startle the driver, due to a creep phenomenon when the shift position of the automatic transmission switches from a non-driving mode to a driving mode (forward gear position). Note that a driving mode refers to a mode in which power from the driving source is transmitted to the drive wheel.

Among vehicle brake systems, there are types of vehicle brake systems that increase pressure of braking fluid with the use of a pressure intensifier that is connected directly to the brake pedal (for example, vehicle brake systems equipped with an electric brake booster).

Consider a situation where a vehicle brake system of one such type is used and, while a driver has a foot resting on the brake pedal, the brake fluid pressure is increased to prevent a sudden movement of a vehicle from a creep phenomenon in the same way as the vehicle brake system of Patent Literature 1. The increase in the brake fluid pressure is achieved by using the pressure intensifier that is connected directly to the brake pedal.

Then, as the brake fluid pressure is increased using the pressure intensifier, the brake pedal will move as if drawn towards a floor panel of the vehicle. This movement of the brake pedal being drawn towards the floor panel while the driver has their foot resting on the brake pedal has the potential of disconcerting the driver.

SUMMARY

To achieve the abovementioned object, a vehicle brake system according to an embodiment of the disclosure includes: a force intensifier that is connected to a brake operator and is configured to increase a braking force that is generated; and a processor configured with a program to perform operations. The operations that are performed include: operation as an information acquisition part configured to obtain first information and second information, the first information being information on whether a shift position of an automatic transmission is in a non-driving mode in which power from a driving source is not transmitted to a drive wheel, and the second information being information on operation on the brake operator; and operation as a braking force controller configured to perform, in response to meeting a predetermined retention condition, control of braking force so that a stationary state of a host vehicle is maintained. Upon satisfying a set of criteria, the braking force controller is configured to perform control to increase the braking force that is generated with the use of the force intensifier once the brake operator is in a non-operated state. The set of criteria includes meeting the predetermined retention condition and the shift position being in the non-driving mode.

DETAILED DESCRIPTION

Details of a vehicle brake system according to one or more embodiments of the disclosure will be given below with reference to the drawings.

Note that, as a general rule, components with a common function or components with a mutually corresponding function use a common reference symbol in the drawings. Furthermore, for convenience of explanation, components may be shown schematically with shapes and sizes of the components modified or exaggerated.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

An object of the disclosure is to provide a vehicle brake system that can eliminate a cause of the driver becoming disconcerted when the BH function is used to prevent a vehicle from moving suddenly due to a creep phenomenon.

A vehicle brake system according to the disclosure can eliminate a cause of the driver becoming disconcerted when the BH function is used to prevent a vehicle from moving suddenly due to a creep phenomenon.

Outline of Vehicle Brake System 11 According to an Embodiment

Figure 1:
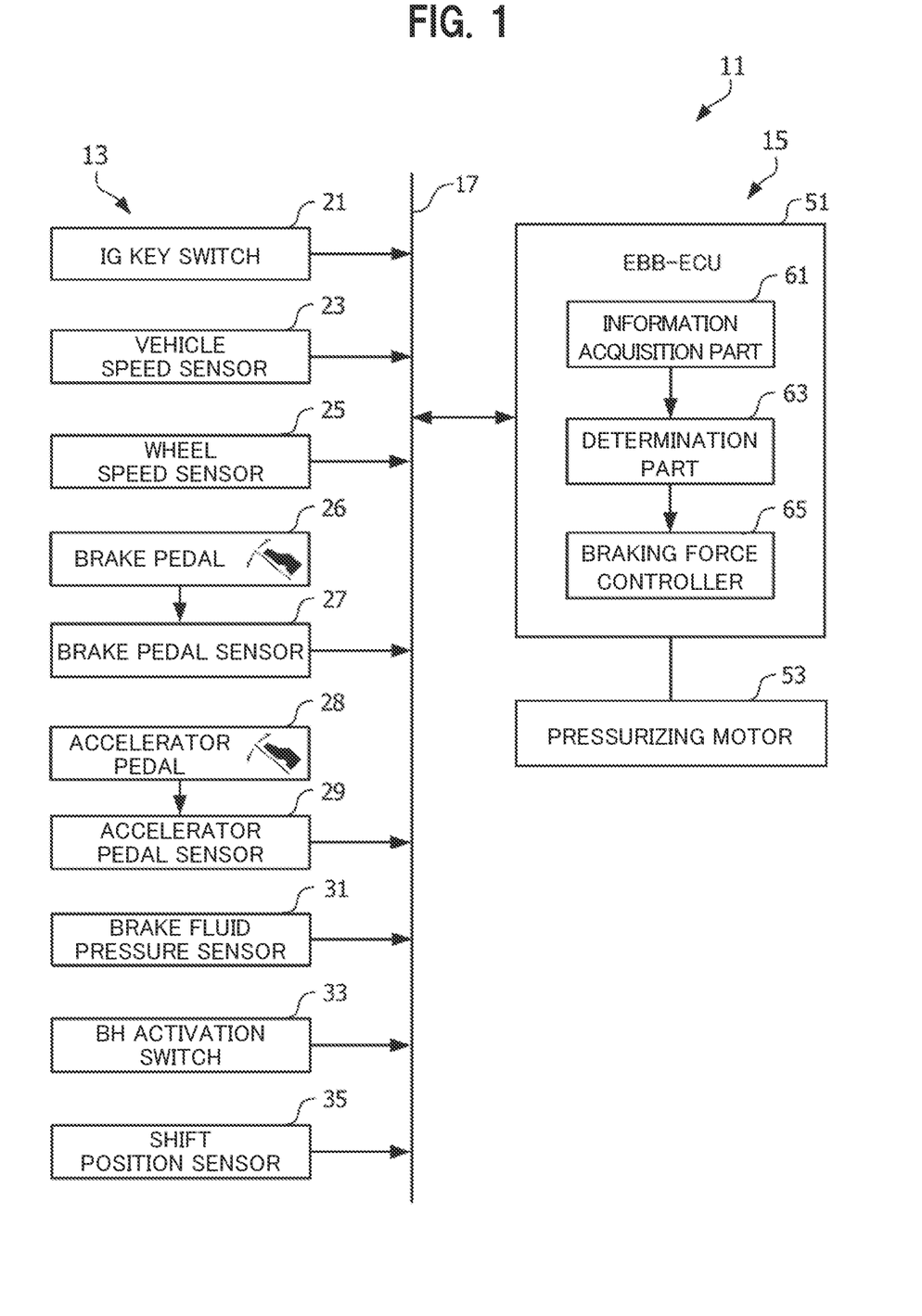
FIG. 1 is a block diagram showing a schematic configuration of a vehicle brake system in accordance with at least one embodiment.

An outline of a vehicle brake system 11 according to an embodiment of the disclosure will be given with reference to FIG. 1. FIG. 1 is a block diagram showing a schematic configuration of the vehicle brake system 11 according to an embodiment of the disclosure.

The vehicle brake system 11 according to an embodiment of the disclosure is based on a brake system that includes an electric brake booster (EBB) such as the ones shown in Patent Literature 2 (Japanese Unexamined Patent Application Publication No. 2017-35966) and Patent Literature 3 (Japanese Unexamined Patent Application Publication No. 2018-96332).

The vehicle brake system 11 includes a function that eliminates a cause of a driver to become disconcerted when a stationary state of a host vehicle (not shown) is maintained even when a shift position of an automatic transmission (not shown) switches from a non-driving mode, in which power from a driving source (not shown) such as an engine is not transmitted to a drive wheel (not shown), to a driving mode, in which power from the driving source is transmitted to the drive wheel.

To realize said function, the vehicle brake system 11 according to an embodiment of the disclosure is configured so that input system elements 13 and an output system element 15 are communicably connected with each other to enable data communication. The input system elements 13 and output system element 15 are communicably connected via a communication medium 17 such as a CAN (Controller Area Network) as shown in FIG. 1.

The input system elements 13 is configured to include, as shown in FIG. 1, an ignition (IG) key switch 21, a vehicle speed sensor 23, a wheel speed sensor 25, a brake pedal sensor 27, an accelerator pedal sensor 29, a brake fluid pressure sensor 31, a BH activation switch 33, and a shift position sensor 35.

The output system element 15 is configured to include an EBB-ECU (electric brake booster-electronic control unit) 51, as shown in FIG. 1.

The IG key switch 21 is a switch that is operated when supplying electric power to electric components that are installed in the vehicle through a vehicle-mounted battery (not shown). When the IG key switch 21 is turned on, electric power is supplied to the EBB-ECU 51, activating the EBB-ECU 51.

A vehicle speed sensor 23 includes a function of detecting travelling speed (vehicle speed) VS of the vehicle. Information concerning the vehicle speed VS detected by the vehicle speed sensor 23 is sent to the EBB-ECU 51 via the communication medium 17.

The wheel speed sensor 25 includes a function of detecting rotating speed (wheel speed) of individual wheels of the host vehicle. Information concerning the wheel speed of individual wheels detected by the wheel speed sensor 25 is sent to the EBB-ECU 51 via the communication medium 17.

The brake pedal sensor 27 includes a function of detecting an operated amount (a pedal stroke) of a brake pedal (brake operator) 26 by the driver and torque. Information concerning the operated amount and the torque of the brake pedal 26 that are detected by the brake pedal sensor 27 is sent to the EBB-ECU 51 via the communication medium 17.

The accelerator pedal sensor 29 includes a function of detecting an operated amount (a pedal stroke) of an accelerator pedal 28 by the driver. Information concerning the operated amount of the accelerator pedal 28 detected by the accelerator pedal sensor 29 is sent to the EBB-ECU 51 via the communication medium 17.

The brake fluid pressure sensor 31 includes a function of detecting brake fluid pressure in a fluid supply path of a brake fluid pressure system. Information on the fluid pressure in the fluid supply path of the brake fluid pressure system is sent to the EBB-ECU 51 via the communication medium 17.

The BH activation switch 33 is, for example, installed in an area around a driver seat and is a switch that is operated by a vehicle occupant when turning on the BH (brake hold) function. The BH activation switch 33 is configured to receive a switch-on operation for the BH function by a vehicle occupant. Information on the switch-on operation received via the BH activation switch 33 is sent to the EBB-ECU 51 via the communication medium 17.

The BH function is a function to maintain the host vehicle in a stationary state by retaining a predetermined braking force when in an ON state. The BH function is set to an ON state when a predetermined retention condition is satisfied.

The predetermined retention condition is satisfied, for example, when the BH activation switch 33 has been turned on, the brake pedal 26 is pressed down, and the vehicle speed VS is less than a predetermined vehicle speed threshold VSth. For the predetermined vehicle speed threshold VSth, a vehicle speed that is slow enough for the host vehicle to come to a stop quickly may be used as deemed appropriate.

Once the BH function is set to an ON state, this ON state is maintained until, for example, the BH activation switch 33 is turned off.

The BH function is configured to operate so that after the host vehicle comes to a stop through pressing down the brake pedal 26, the stationary state of the host vehicle is maintained regardless of whether the brake pedal 26 continues to be pressed down by retaining the brake fluid pressure at the time the host vehicle stopped. Furthermore, the BH function is configured to operate so that when the host vehicle that was in a stationary state starts to move, the brake fluid pressure immediately beforehand is increased to a brake fluid pressure corresponding to a predetermined braking force norm (details to be given later) so that the host vehicle is stopped from moving.

The shift position sensor 35 includes a function of detecting shift position information related to an operation on a shift range switching lever (not shown) by an occupant of the vehicle. The shift position information detected by the shift position sensor 35 is sent to the EBB-ECU 51 via the communication medium 17.

A description of the output system element 15 shown in FIG. 1 will now be given.

The EBB-ECU 51 of the output system element 15 is configured mainly from a microcomputer that includes a central processing unit (CPU), read-only memory (ROM), and random-access memory (RAM). This microcomputer operates by reading out and executing programs and data stored in the ROM and controls the execution of various functions including ab acquisition function for obtaining various information, a braking force determination function, a function to control general braking force, and a function to control braking force based on the BH function.

More specifically, the EBB-ECU 51 operates so that a predetermined fluid pressure is generated in the brake fluid of the brake fluid pressure system by driving a piston (not shown) of a master cylinder (not shown) using a pressurizing motor 53 (see FIG. 1).

To realize said functions, the EBB-ECU 51 includes an information acquisition part 61, a determination part 63, and a braking force controller 65.

The information acquisition part 61 includes a function to obtain various types of information including vehicle speed VS of the host vehicle, wheel speed of individual wheels, an operated amount of the brake pedal 26, an operated amount of the accelerator pedal 28, brake fluid pressure of the brake fluid pressure system, information on a BH switch setting of the BH activation switch 33, and information on a shift position that is detected by the shift position sensor 35. The various types of information obtained by the information acquisition part 61 is used by the EBB-ECU 51 as deemed appropriate.

The determination part 63 performs determination on whether the shift position of the automatic transmission installed in the host vehicle is in a non-driving mode. Furthermore, the determination part 63 performs determination on whether the brake pedal 26 has transitioned from being operated on by being pressed down (brake ON) to not being operated on (brake OFF).

Yet further, the determination part 63 determines whether the predetermined retention condition is satisfied. In other words, the determination part 63 determines whether the BH function is set to an ON state. Yet further, when the BH function is set to an ON state, the determination part 63 determines whether the braking force BKF that is generated from a pressing-down operation on the brake pedal 26 (an operation in which the brake pedal 26 is pressed down by a foot of a driver) is smaller than the predetermined braking force threshold BKFth.

The braking force threshold BKFth is set to a suitable value that takes into consideration the prevention of the host vehicle from moving due to creep torque-induced propulsive force when the shift position of the automatic transmission installed in the host vehicle switches from a non-driving mode (a neutral position, Neutral) to a driving mode (a forward gear position, Drive).

Figure 3A:
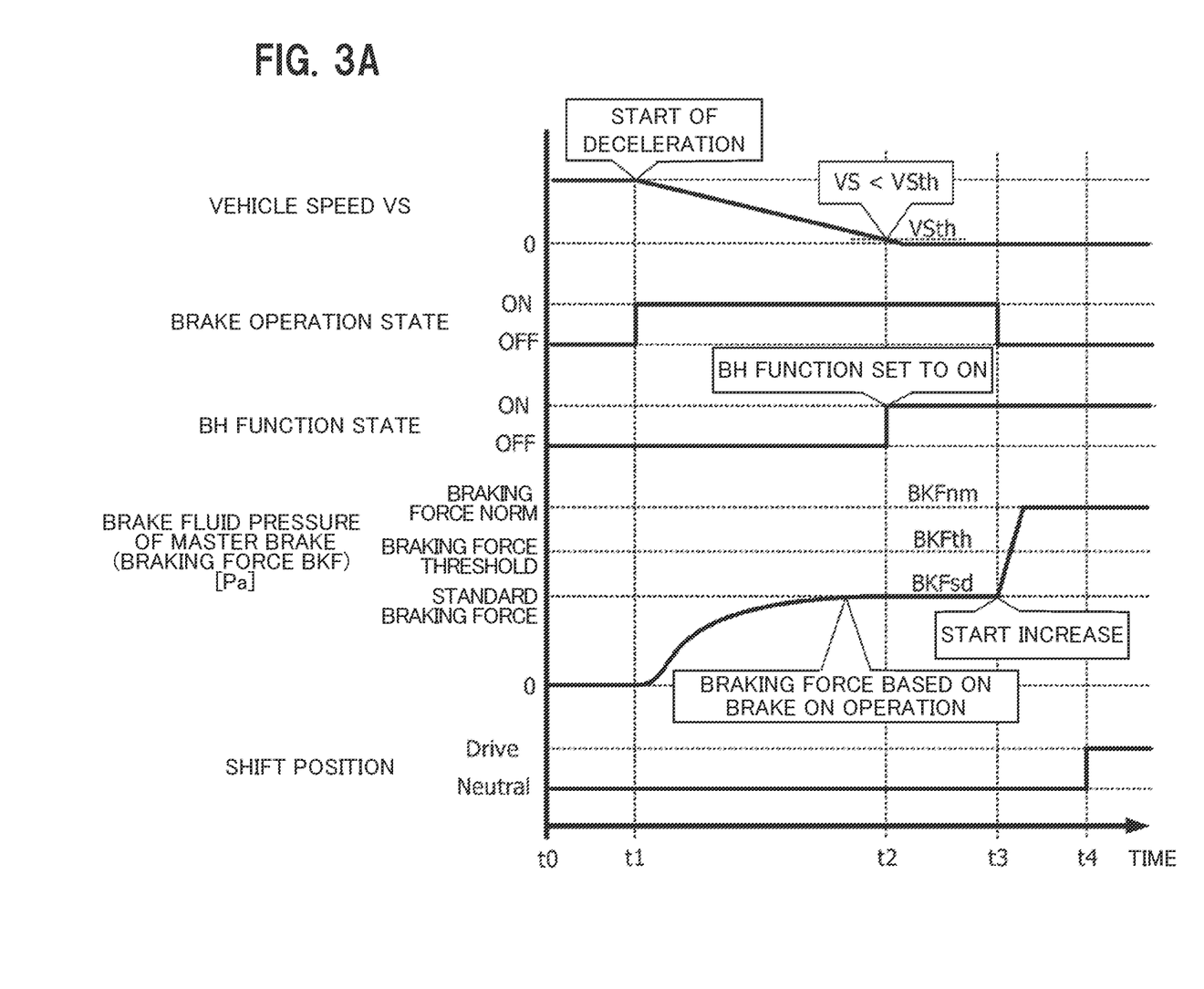
FIG. 3A is a time chart for describing an operation of a vehicle brake system according to at least one embodiment when a braking force based on a brake ON operation is less than a braking force threshold and the brake ON operation is terminated before a shift position transitions from a non-driving mode to a driving mode.

A determination result of the determination part 63 is referenced when the braking force controller 65 decides whether the braking force BKF that has been generated by a pressing-down operation on the brake pedal 26 should be increased to a predetermined braking force norm (see braking force norm BKFnm shown in FIG. 3A). The braking force norm BKFnm is a braking force that is large enough so that the host vehicle will definitely not move from creep torque-induced propulsive force. The braking force norm BKFnm is set to a value that is greater than the braking force threshold BKFth.

When a braking force retention request related to the BH function is generated, by driving the pressurizing motor 53 that the EBB-ECU 51 is equipped with, the braking force controller 65 controls the braking force on the wheels of the host vehicle to be at the braking force norm BKFnm according to a target fluid pressure.

In other words, when a braking force retention request related to the BH function is generated, the braking force controller 65 performs, regardless of whether there is a brake operation by the driver of the host vehicle, braking force control based on a target braking force (the braking force norm, BKFnm) that is set to an appropriate size.

The pressurizing motor 53 corresponds to a force intensifier of the disclosure.

Operation of Vehicle Brake System 11 According to an Embodiment

Figure 2:
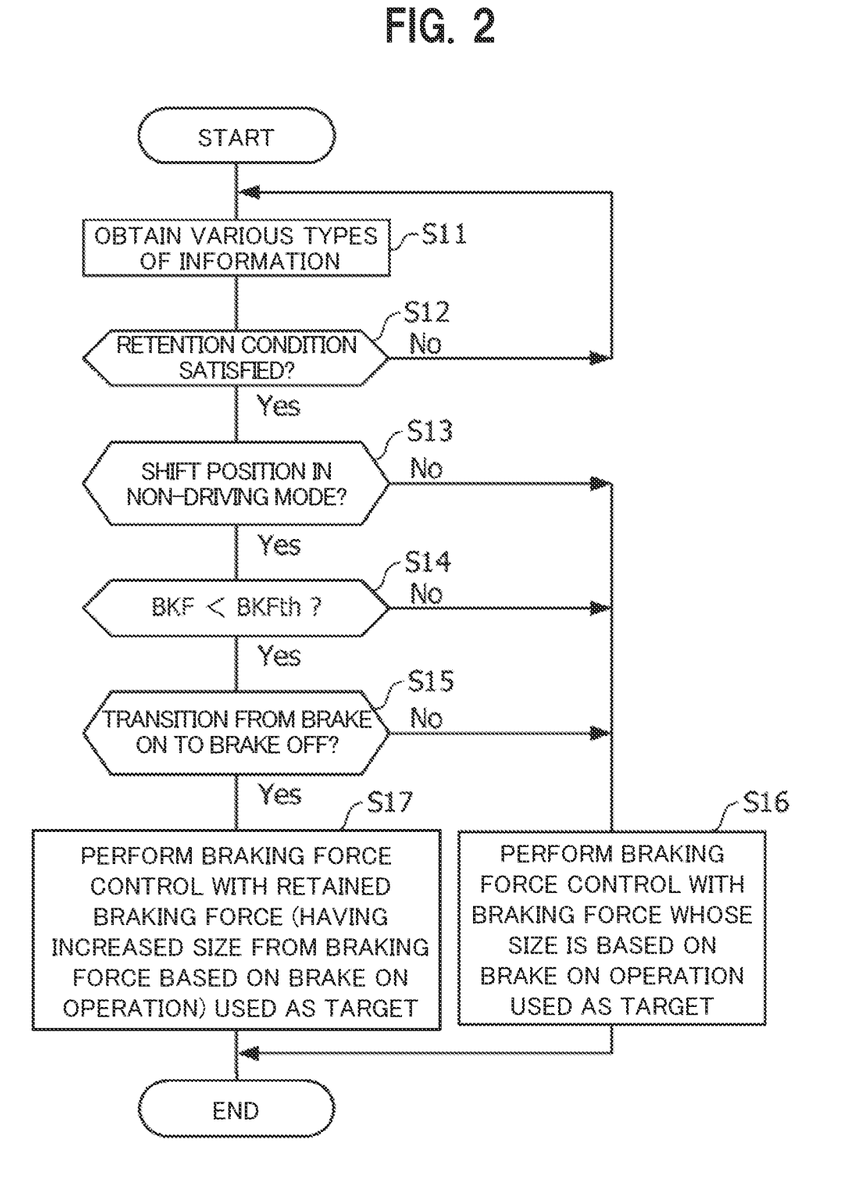
FIG. 2 is a flow chart for describing how a vehicle brake system operates in accordance with at least one embodiment.

Operation of the vehicle brake system 11 according to an embodiment of the disclosure will be described with reference to FIG. 2. FIG. 2 is a flow chart for explaining how a vehicle brake system 11 operates in accordance with an embodiment.

In step S11 of FIG. 2, the information acquisition part 61 of the EBB-ECU 51 obtains various types of information including the vehicle speed VS of the host vehicle, wheel speed of individual wheels, operated amount of the brake pedal 26, operated amount of the accelerator pedal 28, brake fluid pressure of the brake fluid pressure system, information on the BH switch setting of the BH activation switch 33, and information on the shift position that is detected by the shift position sensor 35.

In step S12, the determination part 63 of the EBB-ECU 51 determines whether a predetermined retention condition is satisfied (whether the BH function is set to an ON state). According to an embodiment, the predetermined retention condition is satisfied when the BH activation switch 33 is turned ON, the brake pedal 26 is pressed down, and the vehicle speed VS is less than a predetermined vehicle speed threshold VSth. When the predetermined retention condition is satisfied, the BH function is set to an ON state.

When it is determined in step S12 that the predetermined retention condition is not satisfied (the BH function is not in an ON state), the EBB-ECU 51 returns the process to step S11 and repeats the proceeding steps ("No" of step S12). On the other hand, when it is determined in step S12 that the predetermined retention condition is satisfied (the BH function is in an ON state), the EBB-ECU 51 advances the process to step S13 ("Yes" of step S12).

In step S13, the determination part 63 of the EBB-ECU 51 determines whether the shift position of the automatic transmission installed in the host vehicle is in a non-driving mode.

When it is determined in step S13 that the shift position is not in a non-driving mode ("No" of step S13), the EBB-ECU 51 advances the process to step S16. When, on the other hand, it is determined in step S13 that the shift position is in a non-driving mode ("Yes" of step S13), the EBB-ECU 51 advances the process to step S14.

In step S14, the determination part 63 of the EBB-ECU 51 determines whether the braking force BKF generated by a pressing-down operation on the brake pedal 26 is smaller than a predetermined braking force threshold BKFth.

When it is determined in step S14 that the braking force BKF generated by the pressing-down operation on the brake pedal 26 is greater or equal to the predetermined braking force threshold BKFth ("No" of step S14), the EBB-ECU 51 advances the process to step S16. When, on the other hand, it is determined in step S14 that the braking force BKF generated by the pressing-down operation on the brake pedal 26 is less than the braking force threshold BKFth ("Yes" of step S14), the EBB-ECU 51 advances the process to step S15.

In step S15, the determination part 63 of the EBB-ECU 51 determines whether the brake pedal 26 has transitioned from being operated on by being pressed down (brake ON) to not being operated on (brake OFF).

When it is determined in step S15 that the brake pedal 26 has not transitioned from brake ON to brake OFF ("No" of step S15), the EBB-ECU 51 advances the process to step S16. When, on the other hand, it is determined in step S15 that the brake pedal 26 has transitioned from brake ON to brake OFF ("Yes" of step S15), the EBB-ECU 51 advances the process to step S17.

In step S16, the braking force controller 65 of the EBB-ECU 51 performs braking force control to bring the braking force to a target braking force whose size is based on a pressing-down operation (brake ON operation) on the brake pedal 26.

In step S17, the braking force controller 65 of the EBB-ECU 51 performs braking force control to bring the braking force to a target braking force of a braking force norm (see the braking force norm BKFnm shown in FIG. 3A) with increased size from a braking force based on the pressing-down operation (brake ON operation) on the brake pedal 26. As mentioned before, the braking force norm BKFnm is a braking force that is large enough so that the host vehicle will definitely not move from creep torque induced propulsive force.

In other words, according to the vehicle brake system 11 of an embodiment, when the predetermined retention condition (the BH activation switch 33 is turned ON, the brake pedal 26 is pressed down, and the vehicle speed VS is less than the vehicle speed threshold VSth) is satisfied and the shift position is in a non-driving mode (a neutral position), the braking force controller 65 waits for the brake pedal 26 to be in a non-operated state (brake OFF) to perform braking force control whereby the pressurizing motor 53 (force intensifier) is used to increase the generated braking force to a target braking force. The target braking force used is braking force norm BKFnm of a predetermined size.

Operation Over Time of Vehicle Brake System 11 According to an Embodiment

Operation of the vehicle brake system 11 according to an embodiment of the disclosure over time will be described with reference to FIGS. 3A and 3B.

FIG. 3A is a time chart for describing an operation of the vehicle brake system 11 when a braking force that is based on a brake ON operation is less than the braking force threshold BKFth and the brake ON operation is terminated before the shift position transitions from a non-driving mode to a driving mode. FIG. 3B is a time chart for describing an operation of the vehicle brake system 11 when a brake ON operation intervenes control to increase a braking force that is related to the BH function.

When Braking Force Based on Brake ON Operation is Less than Braking Force Threshold BKFth and Brake ON Operation is Terminated Before Shift Position Transition from Non-Driving Mode to Driving Mode A description of an operation sequence over time of the vehicle brake system 11 will be given, with reference to FIG. 3A, for a case where a braking force based on a brake ON operation is less than the braking force threshold BKFth and the brake ON operation is terminated before the shift position transitions from a non-driving mode to driving mode.

It is assumed that the following conditions apply: the host vehicle is travelling on a level road; the state of the BH function is in an OFF state (however, the BH activation switch 33 is turned ON); the shift position of the automatic transmission is set so that it is in a non-driving mode (neutral position; Neutral).

In a time range from time t0 up to just before time t1 (t0≤time<t1), the vehicle speed VS of the host vehicle is, for example, a constant speed in a medium speed range. The brake operation state is in an OFF state (brake OFF). The BH function state is in an OFF state. The brake fluid pressure of the master brake (braking force BKF) is zero (because of brake OFF). The shift position is set, as described in the assumed set of conditions, to a non-driving mode (neutral position).

At time t1, the brake operation state transitions from the OFF state (brake OFF) to an ON state (brake ON). In response to this, the vehicle speed VS of the host vehicle begins deceleration. However, at time t1, the vehicle speed VS of the host vehicle is still at the above-mentioned constant speed in the medium speed range.

At time t1, the following is true: the BH function state is maintained in the OFF state; the brake fluid pressure of the master brake (braking force BKF) is maintained at zero; the shift position is maintained in the non-driving mode (neutral position).

During a time range from time t1 to just before time t2 (t1≤time<t2), vehicle speed VS of the host vehicle decelerates from the constant speed in the medium speed range to a vehicle speed threshold VSth. The brake operation state is maintained in the ON state (brake ON). The BH function state is still maintained in the OFF state. The brake fluid pressure of the master brake (braking force BKF) gradually increases from zero to a standard braking force BKFsd. The standard braking force BKFsd is a braking force whose size is based on the brake ON operation. The shift position is maintained at the non-driving mode (neutral position).

The standard braking force BKFsd is a braking force that is based on a normal brake ON operation.

At time t2, vehicle speed VS of the host vehicle has decreased to below the vehicle speed threshold VSth. With this, the predetermined retention conditions (the BH activation switch 33 is turned ON, the brake pedal 26 is pressed down, and the vehicle speed VS is less than the vehicle speed threshold VSth) are satisfied. As a result, the state of the BH function transitions from the OFF state to an ON state (an ON setting).

At time t2, the brake operation state is maintained in the ON state (brake ON). The brake fluid pressure of the master brake (braking force BKF) provides a standard braking force BKFsd. The shift position is maintained in the non-driving mode (neutral position).

During a time range from time t2 to just before time t3 (t2≤time<t3), vehicle speed VS of the host vehicle is maintained substantially at zero speed (a stationary state). The brake operation state is maintained in the ON state (brake ON). The BH function state is in the ON state (ON setting). The brake fluid pressure of the master brake (braking force BKF) is maintained at the standard braking force BKFsd. The shift position is maintained in the non-driving mode (neural position).

At time t3, the brake operation state transitions from the ON state (brake ON) to an OFF state (brake OFF). In response to this, the brake fluid pressure of the master brake (braking force BKF) starts to increase. However, at time t3 itself, the brake fluid pressure of the master brake (braking force BKF) is still at the standard braking force BKFsd.

At time t3, vehicle speed VS of the host vehicle is maintained at zero (stationary state). The BH function state is maintained in the ON state (ON setting). The shift position is maintained in a non-driving state (neutral position).

After time t3, the brake fluid pressure of the master brake (braking force BKF) increases rapidly from the standard braking force BKFsd to braking force norm BKFnm, then maintains its value at the braking force norm BKFnm.

At time t4 that comes after time t3, the shift position transitions from the non-driving mode (neutral position) to a driving mode (forward gear position). However, the vehicle speed VS is maintained at zero (stationary state). This is because right after time t3, the brake fluid pressure of the master brake (braking force BKF) was increased so that the braking force norm BKFnm was reached in advance.

After time t3, the brake operation state is maintained in the OFF state (brake OFF). The BH function state is maintained in the ON state (ON setting).

When Brake ON Operation Intervention Occurs During Control to Increase Braking Force Related to BH Function Next, a description of an operation sequence over time of the vehicle brake system 11 will be given, with reference to FIG. 3B, for a case where a brake ON operation intervention occurs during control to increase a braking force related to the BH function.

As in the example above, it is assumed that the following conditions apply: the host vehicle is travelling on a level road; the state of the BH function is in an OFF state (however, the BH activation switch 33 is turned ON); the shift position of the automatic transmission is set so that it is in a non-driving mode (neutral position; Neutral).

The operation of the vehicle brake system 11 during time t0 to time t3 described above and operation of the vehicle brake system 11 during time t0 to time t13a described below are common.

In a time range from time t0 up to just before time t11 (t0≤time<t11), vehicle speed VS of the host vehicle is, for example, a constant speed in a medium speed range. The brake operation state is in an OFF state (brake OFF). The BH function state is in an OFF state. The brake fluid pressure of the master brake (braking force BKF) is zero (because of brake OFF). The shift position is set, as described in the assumed set of conditions, to the non-driving mode (neutral position).

At time t11, the brake operation state transitions from an OFF state (brake OFF) to an ON state (brake ON). In response to this, the vehicle speed VS of the host vehicle begins to decelerate. However, at time t11, the vehicle speed VS of the host vehicle is still at the above-mentioned constant speed in the medium speed range.

At time t11, the following is true. The BH function state is maintained in the OFF state. The brake fluid pressure of the master brake (braking force BKF) is maintained at zero. The shift position is maintained in the non-driving mode (neutral position).

During a time range from time t11 to just before time t12 (t11≤time<t12), vehicle speed VS of the host vehicle decelerates from the constant speed in the medium speed range to the vehicle speed threshold VSth. The brake operation state is maintained in the ON state (brake ON). The BH function state is still maintained in the OFF state. The brake fluid pressure of the master brake (braking force BKF) gradually increases from zero to a standard braking force BKFsd. The standard braking force BKFsd is braking force whose size is based on the brake ON operation. The shift position is maintained in the non-driving mode (neutral position).

At time t12, vehicle speed VS of the host vehicle has decreased to below the vehicle speed threshold VSth. With this, the predetermined retention condition (the BH activation switch 33 is turned ON, the brake pedal 26 is pressed down, and the vehicle speed VS is less than the vehicle speed threshold VSth) is satisfied. As a result, the state of the BH function transitions from the OFF state to an ON state (an ON setting).

At time t12, the brake operation state is maintained in the ON state (brake ON). The brake fluid pressure of the master brake (braking force BKF) provides a standard braking force BKFsd. The shift position is maintained in the non-driving mode (neutral position).

During a time range from time t12 to just before time t13a (t12≤time<t13a), vehicle speed VS of the host vehicle is maintained substantially at zero (stationary state). The brake operation state is maintained in the ON state (brake ON). The BH function state is in the ON state (an ON setting). The brake fluid pressure of the master brake (braking force BKF) is maintained at the standard braking force BKFsd. The shift position is maintained in the non-driving mode (neural position).

At time t13a, the brake operation state transitions from the ON state (brake ON) to an OFF state (brake OFF). In response to this, the brake fluid pressure of the master brake (braking force BKF) starts to increase. However, at time t13a itself, the brake fluid pressure of the master brake (braking force BKF) is still at the standard braking force BKFsd.

At time t13a, vehicle speed VS of the host vehicle is maintained at zero (stationary state). The BH function state is maintained in the ON state (ON setting). The shift position is maintained in the non-driving state (neutral position).

During a time range from time t13a to just before time t13b (t13a time<t13b), the brake fluid pressure of the master brake (braking force BKF) increases rapidly from the standard braking force BKFsd to the braking force norm BKFnm. Vehicle speed VS of the host vehicle is maintained at zero (stationary state). The brake operation state is in the OFF state (brake OFF). The BH function is maintained in the ON state (ON setting). The shift position is maintained in the non-driving mode (neutral position).

At time t13b, the brake operation state transitions from the OFF state (brake OFF) to an ON state (brake ON).

At time t13b, vehicle speed VS of the host vehicle is maintained at zero (stationary state). The BH function state is maintained in the ON state (ON setting). The brake fluid pressure of the master brake (braking force BKF) provides a braking force norm BKFnm value. The shift position is maintained in the non-driving mode (neutral position).

During a time range from time t13b to just before time t13c (t13b time<t13c), the brake fluid pressure of the master brake (braking force BKF) increases beyond the braking force norm BKFnm value. This increase is based on a brake ON operation of the driver pressing down hard on the brake pedal 26.

During the time range from time t13b to just before time t13c, vehicle speed VS of the host vehicle is maintained at zero (stationary state). The brake operation state is in the ON state (brake ON). The BH function state is maintained in the ON state (ON setting). The shift position is maintained in the non-driving mode (neutral position).

At time t13c, the brake operation state transitions from the ON state (brake ON) to an OFF state (brake OFF). In response to this, the brake fluid pressure of the master brake (braking force BKF) starts to decrease. However, at time t13c itself, the brake fluid pressure of the master brake (braking force BKF) maintains a value that is greater than the braking force norm BKFnm.

At time t13c, vehicle speed VS of the host vehicle is maintained at zero (stationary state). The BH function state is maintained in the ON state (ON setting). The shift position is maintained in the non-driving mode (neutral position).

During a time range from time t13c to t13d, the brake fluid pressure of the master brake (braking force BKF) decreases from a value that exceeds the braking force norm BKFnm until the braking force norm BKFnm is reached. This settling of the brake fluid pressure of the master brake (braking force BKF) to the braking force norm BKFnm is based on a braking force control for the BH function with the braking force norm BKFnm as the target braking force.

During a time range from time t13c to t13d, vehicle speed VS of the host vehicle is maintained at zero (stationary state). The brake operation state is in the OFF state (brake OFF). The BH function state is maintained in the ON state (ON setting). The shift position is maintained in the non-driving mode (neutral position).

At time t14, the shift position transitions from the non-driving mode (neutral position) to a driving mode (forward gear position). However, vehicle speed VS of the host vehicle is maintained at zero (stationary state). This is because since time t13b, the brake fluid pressure of the master brake (braking force BKF) has been increased in advance to (at least) the braking force norm BKFnm.

Advantageous Effects of Vehicle Brake System 11 According to an Embodiment

Advantageous effects of the vehicle brake system 11 according to an embodiment of the disclosure will be described.

According to a first aspect of the disclosure, a vehicle brake system 11 includes: a pressurizing motor (a force intensifier) 53 that is connected to a brake pedal (a brake operator) 26 and is configured to increase braking force; and a processor configured with a program to perform operations including operation as an information acquisition part 61 and operation as a braking force controller 65.

The information acquisition part 61 is configured to obtain information on whether a shift position of an automatic transmission is in a non-driving mode in which power from a driving source is not transmitted to a drive wheel. The information acquisition part 61 is also configured to obtain information on operation on the brake pedal (brake operator) 26.

The braking force controller 65 is configured to perform, when a predetermined retention condition is met, control of braking force so that a stationary state of a host vehicle is maintained.

When the predetermined retention condition is met and the shift position is in the non-driving mode, the braking force controller 65 is configured to perform control to increase the braking force that is generated using the force intensifier once the brake pedal 26 is in a non-operated state.

According to the first aspect, the information acquisition part 61 of the vehicle brake system 11 obtains the following information: information on whether the shift position of an automatic transmission is in a non-driving mode (neutral position) in which power from a driving source is not transmitted to a drive wheel; and information on operation on the brake pedal 26. The braking force controller 65 is configured to control the braking force so that a stationary state of a host vehicle is maintained when a predetermined retention condition is met.

In particular, when the retention condition is met and the shift position is in a non-driving mode (neutral position) and once the brake pedal 26 is in a non-operated state, the braking force controller 65 performs control to increase the braking force that is generated using the force intensifier.

The predetermined retention condition may for example adopt meeting the following criteria: a BH activation switch 33 is turned on; the brake pedal 26 is pressed down; and the vehicle speed VS is less than a predetermined vehicle speed threshold VSth.

Consider a case where the above-mentioned retention condition is met and the shift position is in a non-driving mode (neutral position), and control is performed to increase the braking force that is generated by using the force intensifier when a foot of the driver is on the brake pedal 26. Then, with the increase in the braking force, the brake pedal 26 will move as if it is drawn towards a floor panel of the vehicle. As a result of this movement of the brake pedal 26, on which a foot of the driver is on, being drawn towards the floor panel had the potential of disconcerting the driver.

Therefore, a vehicle brake system 11 according to the first aspect is configured so that when the retention condition is met and the shift position is in a non-driving mode (neutral position), control to increase the braking force that is generated using the force intensifier is performed after the brake pedal 26 is in a non-operated state.

A vehicle brake system 11 according to the first aspect can eliminate a cause of the driver becoming disconcerted when the BH function is used to prevent a vehicle from moving suddenly due to a creep phenomenon.

A vehicle brake system 11 according to the second aspect of the disclosure is configured based on a vehicle brake system 11 according to the first aspect and furthermore includes a determination part 63 that is configured to determine whether a braking force that is generated by operating the brake pedal 26 is less than a predetermined braking force threshold BKFth. The predetermined braking force threshold BKFth may for example be set to a suitable value that takes into consideration the prevention of the host vehicle from moving due to creep torque induced propulsive force when the shift position switches from a non-driving mode (a neutral position) to a driving mode (a forward gear position).

When the predetermined retention condition is met, the shift position is in a non-driving mode, and the braking force that is generated through operation of the brake pedal 26 is determined to be less than the predetermined braking force threshold BKFth, the braking force controller 65 is configured to perform control to increase the braking force that is generated by using the force intensifier once the brake pedal 26 is in a non-operated state.

The vehicle brake system 11 according to the second aspect differs from the vehicle brake system 11 according to the first aspect in that the criteria used to determine whether to perform control to increase the braking force that is generated by using the force intensifier includes the following additional criterion: whether the braking force that is generated by operating the brake pedal 26 is less than the predetermined braking force threshold BKFth.

By configuring so that control to increase the braking force is performed only when the braking force that is generated by operating the brake pedal 26 is less than the predetermined braking force threshold BKFth, control to increase the braking force can be performed appropriately and at appropriate times.

According to the second aspect, the vehicle brake system 11 can perform control of increasing the braking force appropriately and at appropriate times compared to the vehicle brake system 11 according to the first aspect.

A vehicle brake system 11 according to a third aspect of the disclosure is configured based on a vehicle brake system 11 according to the first aspect and furthermore includes a determination part 63 that is configured to determine whether the braking force that is generated is smaller than a predetermined braking force threshold BKFth.

When the predetermined retention condition is met, the shift position is in a non-driving mode, and the braking force that is generated is determined to be less than the predetermined braking force threshold BKFth, the braking force controller 65 is configured to perform control to increase the braking force that is generated by using the force intensifier (braking force related to the BH function) to a braking force norm BKFnm of a predetermined size, once the brake pedal 26 is in a non-operated state.

A vehicle brake system 11 according to the third aspect differs from the vehicle brake system 11 according to the second aspect in that a braking force norm BKFnm of a predetermined size is used regarding how much the braking force related to the BH function is to be increased. For the braking force norm BKFnm of a predetermined size, braking force that is large enough so that the host vehicle will definitely not move from creep torque-induced propulsive force may be selected.

By using the braking force norm BKFnm of a predetermined size for the braking force related to the BH function, the advantageous effect of preventing the host vehicle from moving can be strengthened further compared to the vehicle brake system 11 according to the first aspect.

A vehicle brake system 11 according to a fourth aspect of the disclosure is configured based on a vehicle brake system 11 according to the first, second, or third aspect.

Furthermore, the braking force controller 65 of the vehicle brake system 11 according to the fourth aspect is configured, in response to the brake pedal 26 transitioning from a non-operated state to an operated state while control is being performed to increase the braking force related to the BH function using the pressurizing motor (force intensifier) 53, to perform control to adjust the braking force to a first target braking force that is based on an operated state of the brake pedal 26.

Figure 3B:
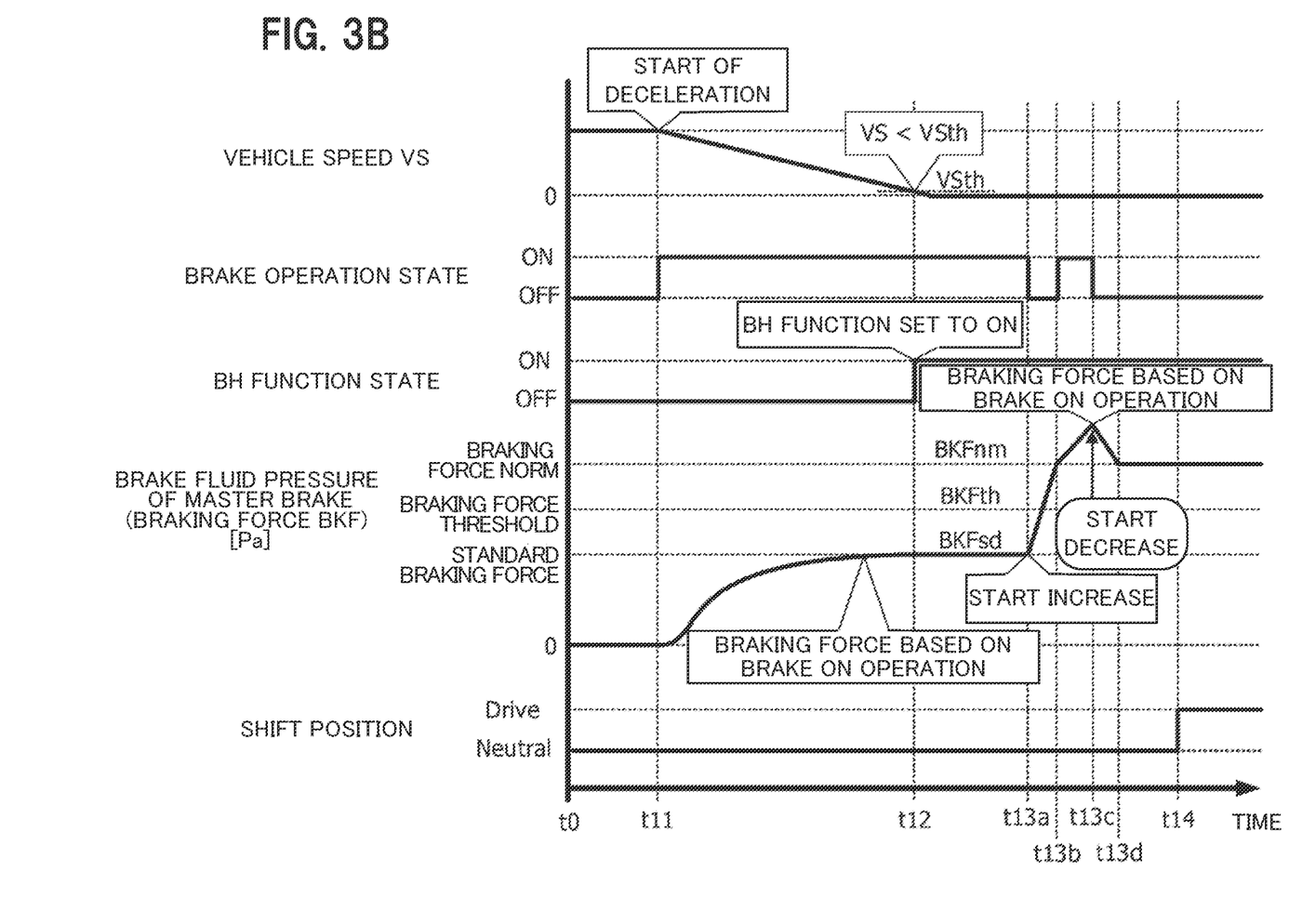
FIG. 3B is a time chart for describing an operation of a vehicle brake system according to at least one embodiment when a brake ON operation intervention occurs during control to increase a braking force related to the BH function.

With the vehicle brake system 11 according to a fourth aspect, when the brake pedal 26 transitions from a non-operated state to an operated state while control is being performed to increase the braking force related to the BH function using the force intensifier (for example, see the "brake operation state" at time t13b in FIG. 3B), the braking force controller 65 performs control to adjust the braking force using as a first target a braking force that is based on an operated state of the brake pedal 26 (braking force based on a brake ON operation).

By adjusting the braking force to reach the first target braking force based on the brake ON operation in this way, braking force that is consistent with the braking request of the driver and therefore is not disconcerting can be achieved.

The vehicle brake system 11 according to the fourth aspect is configured to perform control to adjust the braking force to a first target braking force based on a brake ON operation when the brake pedal 26 transitions from a non-operated state to an operated state while control is being performed to increase the braking force related to the BH function. Because of this, in addition to the advantageous effects of a vehicle brake system 11 according to the first, second, or third aspect, the vehicle brake system 11 realizes a braking force that is consistent with the braking request of the driver and that is therefore not disconcerting to the driver.

A vehicle brake system 11 according to a fifth aspect of the disclosure is configured based on a vehicle brake system 11 according to the fourth aspect. Furthermore, in response to the brake pedal 26 transitioning from an operated state to a non-operated state while control is being performed to adjust the braking force to the first target braking force that is based on the operated state of the brake pedal 26, the braking force controller of the vehicle brake system 11 according to the fifth aspect is configured to perform control to adjust the braking force to a second target braking force. The second target braking force is a braking force norm BKFnm that is greater than a predetermined braking force threshold BKFth and is large enough to maintain the stationary state of the host vehicle upon the shift position transitioning from a non-driving mode (neutral position) to a driving mode (forward gear position).

With the vehicle brake system 11 according to the fifth aspect, when the brake pedal 26 transitions from an operated state to a non-operated state while control is being performed to adjust the braking force to a first target braking force that is based on the operated state of the brake pedal 26 (for example, see the "brake operation state" at time t13c in FIG. 3B), the braking force controller 65 performs control to adjust the braking force to a second target braking force. The second target braking force is a braking force norm BKFnm that is greater than a predetermined braking force threshold BKFth and is large enough to maintain the stationary state of the host vehicle even when the shift position transitions from the non-driving mode (neutral position) to a driving mode (forward gear position).

By adjusting the braking force to a targeted braking force norm BKFnm, the stationary state of the host vehicle can be maintained with certainty even when the shift position transitions from a non-driving mode (neutral position) to a driving mode (forward gear position).

The vehicle brake system 11 according to the fifth aspect is configured to adjust the braking force using a braking force norm BKFnm as a target when the brake pedal 26 transitions from an operated state to a non-operated state while control is being performed to adjust the braking force to a first target braking force based on the operated state of the brake pedal 26. Because of this, in addition to the advantageous effect of the vehicle brake system 11 according to the fourth aspect, the vehicle brake system 11 according to the fifth aspect has the advantageous effect of being able to maintain a stationary state of the host vehicle with certainty even when the shift position transitions from a non-driving mode to a driving mode.

Other Embodiments

The embodiments described above serve to illustrate different examples of realizing the disclosure. The technical scope of the disclosure should not be construed as being limited to these embodiments. The disclosure can be embodied in various forms without departing from the gist or the main features of the disclosure.

What is claimed is:
1. A vehicle brake system comprising:
a force intensifier that is connected to brake pedal and is configured to increase a braking force that is generated; and
a processor configured with a program to perform operations comprising:
operation as an information acquisition part configured to obtain first information and second information, the first information being information on whether a shift position of an automatic transmission is in a non-driving mode in which power from a driving source is not transmitted to a drive wheel, and the second information being information on an operation of the brake pedal; and operation as a braking force controller configured to perform, in response to meeting a predetermined retention condition, control of the braking force so that a stationary state of a host vehicle is maintained, wherein the predetermined retention condition includes a brake hold activation switch being turned on, the brake pedal being in an operated state, and a vehicle speed being less than a predetermined vehicle speed threshold, upon satisfying the predetermined retention condition and when the shift position is in the non-driving mode, the braking force controller is configured to perform control to increase the braking force that is generated to a braking force norm with the use of the force intensifier once the brake pedal is in a non-operated state, and the braking force norm is set large enough to prevent the host vehicle from moving due to creep-torque induced force.

2. The vehicle brake system according to claim 1, wherein the processor is further configured with the program to perform operation as a determination part, the determination part is configured to determine whether a braking force that is generated by operating the brake pedal is less than a predetermined braking force threshold, upon satisfying the predetermined retention condition and when the shift position is in the non-driving mode and the braking force is determined to be less than the predetermined braking force threshold, the braking force controller is configured to perform control to increase the braking force that is generated to the braking force norm with the use of the force intensifier once the brake pedal is in the non-operated state, and the braking force norm is set to a predetermined value that is greater than the braking force threshold.

3. The vehicle brake system according to claim 2, wherein in response to the brake pedal transitioning from a non-operated state to an operated state while control is being performed to increase the braking force using the force intensifier, the braking force controller is configured to perform control to adjust the braking force to a first target braking force, and the first target braking force is a braking force based on the operated state of the brake pedal.

4. The vehicle brake system according to claim 3, wherein in response to the brake pedal transitioning from an operated state to a non-operated state while control is being performed to adjust the braking force to the first target braking force, the braking force controller is configured to perform control to adjust the braking force to a second target braking force, and the second target braking force is the braking force norm that is greater than the predetermined braking force threshold and is large enough to maintain the stationary state of the host vehicle upon the shift position transitioning from the non-driving mode to a driving mode.

5. The vehicle brake system according to claim 1, wherein in response to the brake pedal transitioning from a non-operated state to an operated state while control is being performed to increase the braking force using the force intensifier, the braking force controller is configured to perform control to adjust the braking force to a first target braking force, and the first target braking force is a braking force based on the operated state of the brake pedal.

6. The vehicle brake system according to claim 5, wherein in response to the brake pedal transitioning from an operated state to a non-operated state while control is being performed to adjust the braking force to the first target braking force, the braking force controller is configured to perform control to adjust the braking force to a second target braking force, and the second target braking force is the braking force norm that is greater than a predetermined braking force threshold and is large enough to maintain the stationary state of the host vehicle upon the shift position transitioning from the non-driving mode to a driving mode.

7. The vehicle brake system according to claim 1, wherein the non-driving mode of the shift position is a neutral position.

8. The vehicle brake system according to claim 1, wherein the force intensifier is a pressurizing motor configured to apply brake fluid pressure.

* * * * *